(12) United States Patent
Lefebvre et al.

(10) Patent No.: US 10,614,155 B2
(45) Date of Patent: Apr. 7, 2020

(54) SINGLE PAGE APPLICATION AUTHORING IN A CONTENT MANAGEMENT SYSTEM

(71) Applicant: Adobe Inc., San Jose, CA (US)

(72) Inventors: R. Bruce Lefebvre, Ottawa (CA); Ken Beaton, Ottawa (CA); Alexis Beingessner, Ottawa (CA)

(73) Assignee: Adobe Inc., San Jose, CA (US)

( * ) Notice: Subject to any disclaimer, the term of this patent is extended or adjusted under 35 U.S.C. 154(b) by 435 days.

(21) Appl. No.: 14/231,826

(22) Filed: Apr. 1, 2014

(65) Prior Publication Data

US 2015/0278171 A1    Oct. 1, 2015

(51) Int. Cl.

| | |
|---|---|
| *G06F 17/24* | (2006.01) |
| *G06F 17/22* | (2006.01) |
| *H04L 29/06* | (2006.01) |
| *H04L 29/08* | (2006.01) |
| *H04W 4/50* | (2018.01) |

(52) U.S. Cl.
CPC .......... *G06F 17/2247* (2013.01); *G06F 17/24* (2013.01); *H04L 67/02* (2013.01); *H04L 67/42* (2013.01); *H04W 4/50* (2018.02)

(58) Field of Classification Search
CPC ...... G06F 17/24; G06F 17/25; G06F 17/2247; G06T 11/60; A63F 2300/5553; A63F 2300/6623; H04L 67/02; H04L 67/42; H04W 4/001
USPC ................. 715/201, 202, 230, 255
See application file for complete search history.

(56) References Cited

U.S. PATENT DOCUMENTS

| | | | | |
|---|---|---|---|---|
| 2010/0095197 | A1* | 4/2010 | Klevenz | G06F 17/2247 715/234 |
| 2011/0113090 | A1* | 5/2011 | Peeri | H04L 67/2823 709/203 |
| 2012/0036264 | A1* | 2/2012 | Jiang | H04L 67/02 709/226 |
| 2013/0073387 | A1* | 3/2013 | Heath | G06Q 50/01 705/14.53 |
| 2014/0089786 | A1* | 3/2014 | Hashmi | G06F 17/2247 715/234 |
| 2014/0258969 | A1* | 9/2014 | Brown | G06F 8/30 717/103 |
| 2015/0052498 | A1* | 2/2015 | Chauhan | G06F 16/951 717/109 |
| 2017/0300861 | A9* | 10/2017 | Avats | G06Q 10/1053 |

* cited by examiner

*Primary Examiner* — Andrew R Dyer
*Assistant Examiner* — Jenq-Kang Chu
(74) *Attorney, Agent, or Firm* — Finch & Maloney PLLC (57) ABSTRACT

A user can produce a single page application using content that is automatically extracted from the content management system. When the user decides that authored application content is ready for publication, the relevant content can be exported using an application data structure builder that is configured to generate a single page application data structure that includes the content items to be used by the application. For example, in one embodiment this application data structure comprises an HTML DOM application structure having individual page content wrapped into unique div elements. Such an application data structure that can be wrapped within a platform-specific shell using resources provided by a mobile development framework. Thus the application data structure can form the basis for a fully functional, platform-specific single page application or cross-platform hybrid single page application.

20 Claims, 4 Drawing Sheets

SINGLE PAGE APPLICATION AUTHORING IN A CONTENT MANAGEMENT SYSTEM

FIELD OF THE INVENTION

This disclosure relates generally to the authoring of an application that is adapted for use with a mobile computing device, and more specifically to workflows that facilitate the authoring of a single page application using digital content managed by a content management system.

BACKGROUND

As mobile computing devices such as smartphones and tablet computers have become increasingly ubiquitous, consumers have come to demand a wide range of functionality from such devices. This functionality is commonly provided by an ever-growing number of software applications which are often specifically configured for use with mobile computing devices. Such applications are often referred to as "mobile applications" or "apps", the shortened forms matching the typically smaller scope compared to applications used by personal computers and other more powerful computing devices. One of the ways that an app can be specifically configured for use with a mobile computing device is by being designed to use fewer memory and/or processor resources. Apps may also be configured to use less network bandwidth since users of mobile computing devices often seek to reduce network data transmissions due to limited bandwidth availability and/or data transmission charges. One way that such concerns have been addressed is through the use of a single page application, which is an app that can be delivered by loading a single web page, with additional resources being dynamically loaded and added to the page as necessary based on subsequent user interaction with the app. Once a single page application is launched, page reloads are reduced or wholly eliminated, thereby reducing communications with the originating web server. In addition, subsequent communications with the server can be configured to occur in the background without user awareness, thereby providing a more fluid and responsive user experience as compared to conventional web browsing interactions.

DETAILED DESCRIPTION

While existing mobile development frameworks provide application developers with the ability to generate applications that are specifically configured for a variety of different mobile computing platforms, such frameworks nevertheless suffer from certain shortcomings. Perhaps most significantly, existing mobile development frameworks tend to suffer from a lack of integration with modern content management systems. Content management systems are widely used in the generation, publication, and management of content provided via websites and mobile applications. However, content management systems are generally organized around the concept of individual content items which relate to each other according to a particular organizational structure, such as a hierarchical tree. This is useful in the context of webpage management, where the managed content items can be understood as corresponding to the pages comprising the website or even to specific content items on such pages. While many mobile applications share this page-based content model, this structural approach tends to require frequent loading of pages as a user navigates through the app. This can result in a cumbersome and sluggish user experience when working with a mobile device that has limited memory and/or processor resources, or that is connected via a low-bandwidth cellular data connection. A page-based content model also hinders adoption of cross-platform hybrid applications in which content is organized using, for example, a hypertext markup language (HTML) document object model (DOM) application structure that is provided within a platform-specific shell. While use of a single page application can, in theory, address some of these shortcomings, there does not exist an easy way to convert multi-page content items originating from a content management system into an application data structure that can form the basis for a single page application.

Thus, and in accordance with certain embodiments of the present invention, techniques are disclosed herein that allow a user to author a single page application using content managed by a content management system. In particular, a user can produce a single page application using familiar content authoring tools and resources provided by a content management system, and using content that is automatically extracted from the content management system. When the user decides that the application is ready for publication, the content included within the application can be exported using an application data structure builder. Such a builder can be configured to generate a single page application data structure that includes the content items to be used by the application. For example, in one embodiment this application data structure comprises an HTML DOM application structure that can be wrapped within a platform-specific shell using resources provided by a mobile development framework. Thus the application data structure can form the basis for a fully functional, platform-specific single page application or cross-platform hybrid single page application. Because the application data structure is built using content items extracted from the content management system without user intervention, the user advantageously requires no knowledge of HTML, JavaScript, Cascading Style Sheets (CSS), or other similar programming resources which are conventionally required to generate a single page application data structure. Numerous configurations and variations of the mobile application authoring techniques described herein will be apparent in light of this disclosure.

As used herein, the term "content" refers, in addition to its ordinary meaning, to information intended for direct or indirect consumption by a user. For example, the term content encompasses information directly consumed by a user such as when it is displayed on a display device or printed on a piece of paper. The term content also includes information that is not specifically intended for display, and therefore also encompasses items such as software, software applications including mobile applications, executable instructions, scripts, hyperlinks, addresses, pointers, metadata, and formatting information. The use of the term content is independent of (a) how the content is presented to the user for consumption and (b) the software application used to create and/or render the content. The term "digital content" refers to content which is encoded in binary digits (for example, zeroes and ones); in the context of applications involving digital computers, the terms "content" and "digital content" are thus often used interchangeably.

As used herein, the term "content management system" refers, in addition to its ordinary meaning, to a system that can be used in an online environment to generate, modify, publish, and/or maintain content that is stored in a data repository. A content management system can therefore be understood as providing functionalities which are particularly adapted for workflow management in an online environment, including content authoring and publication functionality for websites, software applications, and mobile applications. These functionalities, which may be provided by one or more modules or sub-modules that form part of the content management system, may be further adapted to allow multiple users to work collaboratively with the content being managed by the content management system. Such systems can be used to manage a wide variety of different types of content, including textual content, graphical content, multimedia content, executable content, and application user interface elements. Example user interface elements include, but are not limited to, selection menus, carousel selectors, toggle switches, text entry fields, and scroll bars. Content management systems are often implemented in a client-server computing environment that allows a plurality of different users to access a central content repository where the managed content is stored. Examples of commercially available content management systems include Adobe® Experience Manager (Adobe Systems Incorporated, San Jose, Calif.) and Microsoft SharePoint (Microsoft Corporation, Redmond, Wash.).

As used herein, the term "single page application" refers, in addition to its ordinary meaning, to an application that can be delivered to an end user by loading a single web page into memory, with additional resources being dynamically loaded and added to the page based on subsequent user interaction with the application. Although a single page application can be configured to operate without reloading page contents or transferring control to another webpage or application, the perception of navigability of separate logical pages may still be provided using, for example, HTML programming techniques. Thus execution of a single page application may involve background interactions with an originating server that are transparent to a user of the application. Such background server interactions may be provided using, for example, Asynchronous JavaScript and extensible markup language (AJAX) calls, or other JavaScript frameworks. For instance, a single page application would be capable of redrawing a portion of a user interface without server interaction. Therefore, as compared to an application that relies on retrieving updated HTML code from a server to redraw the user interface, the single page application will generally have reduced bandwidth and client-side processing capacity requirements. Single page applications are therefore considered to be well-suited for use in mobile computing environments.

As used herein, the term "mobile development framework" refers, in addition to its ordinary meaning, to a software framework that is designed to support the development of mobile applications that leverage the capabilities of one or more mobile computing platforms, such as Apple iOS (Apple Inc., Cupertino, Calif.), Google Android (Google Inc., Mountain View, Calif.), Windows Phone (Microsoft Corp., Redmond, Wash.), or BlackBerry (BlackBerry Ltd., Waterloo, ON). Examples of mobile development frameworks include PhoneGap (Adobe Systems Incorporated, San Jose, Calif.) and Telerik AppBuilder (Telerik, Palo Alto, Calif.). For example, a mobile development framework can be configured to wrap an HTML-based application data structure into an application capable of being executed on a given mobile computing platform. Thus such a framework can be understood as providing a link between application content, such as may be obtained from a content management system as disclosed herein, to a fully-functional platform-specific application, such as may be made available through an online application store. Mobile development frameworks can be used to produce both platform-specific mobile applications and cross-platform hybrid applications in which HTML, JavaScript, CSS, or other content is provided within a platform-specific shell.

System Architecture

Figure 1:
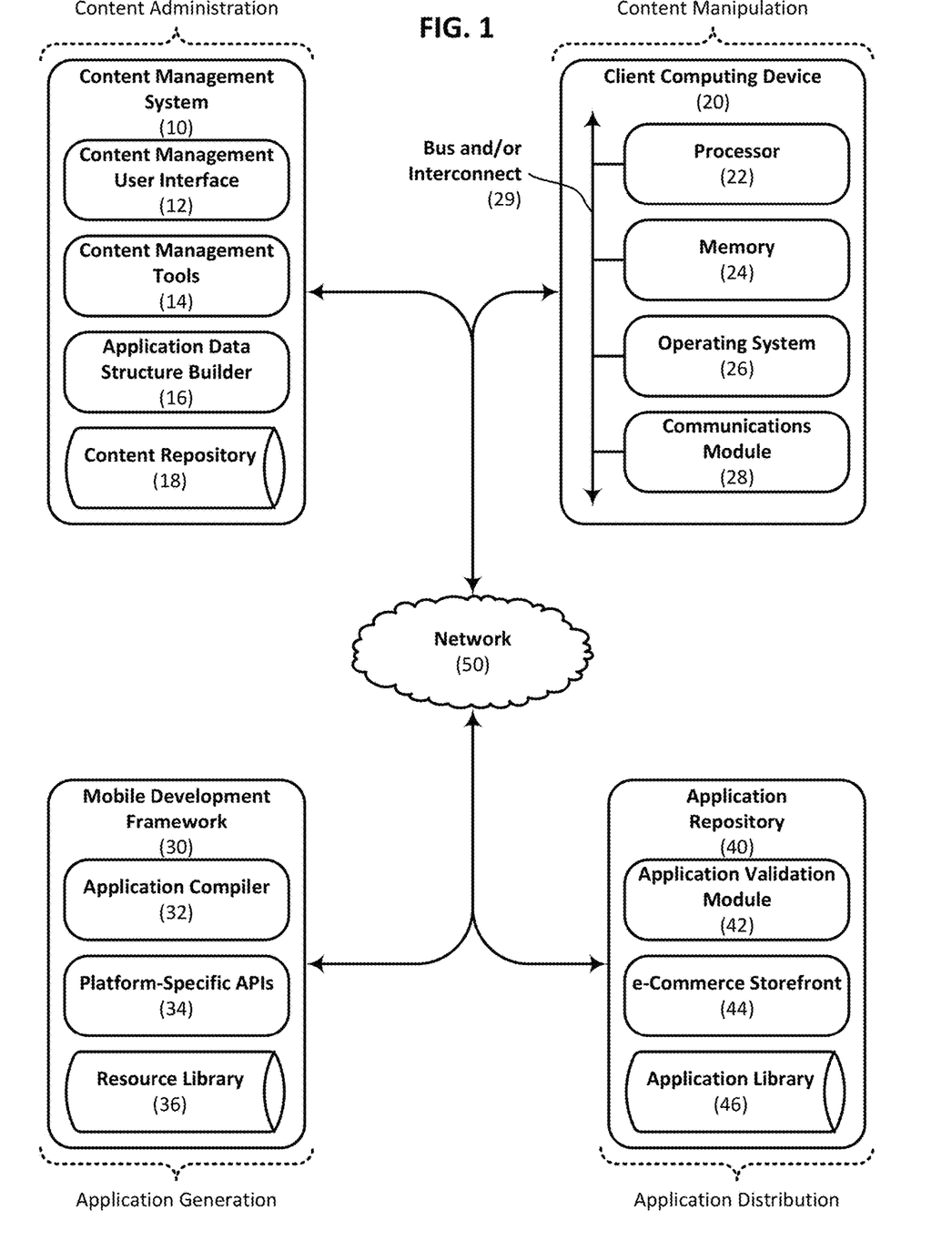
FIG. 1 is a block diagram schematically illustrating selected components of a networked computer system that can be used to produce a single page application using digital content provided by a content management system in accordance with certain embodiments of the present invention.

FIG. 1 is a block diagram schematically illustrating selected components of a networked computer system that can be used to generate a single page application using digital content provided by a content management system in accordance with certain embodiments of the present invention. This networked computer system includes, for example, a content management system 10 configured to provide content administration services, at least one client computing device 20 configured to provide content manipulation functionality, such as content generation and modification functionality, a mobile development framework 30 configured to generate mobile applications, and an application repository 40 configured to facilitate application distribution. These components may communicate and interact with each other, and optionally with other devices and/or resources, via network 50. Network 50 may be a local area network (such as a home-based or office network), a wide area network (such as the Internet), or a combination of such networks, whether public, private, or both. In some cases access to resources on a given network or computing system may require credentials such as usernames, passwords, and/or any other suitable security mechanism. The functionality of these components will be described in turn, although it will be appreciated that other embodiments may include additional or fewer components, and that the claimed invention is not intended to be limited to any particular set of components or any particular hardware configuration.

Content management system 10 and client computing device 20 can be implemented in a client-server computing environment that allows a user of device 20 to access content and services provided by content management system 10. For example, in such embodiments content management system 10 includes a content management user interface 12 and content management tools 14 that enable a user of device 20 to access and manipulate content stored in a content repository, such as a content repository 18 hosted by content management system 10. Such access and manipulation may include functionality provided in conjunction with mobile application authoring workflows. For instance, in one embodiment content management user interface 12 and content management tools 14 are configured to generate a graphical user interface that allows a user to drag-and-drop content items, user interface elements, and control features into a page template that is to form part of a mobile application being authored by the user. Content management system 10 optionally includes other subcomponents that can be configured to provide other content management functionality depending on the needs of a particular application. Such subcomponents can take the form of server-side modules which interact with and/or respond to user input provided via client computing device 20.

For example, in certain embodiments content management system 10 includes an application data structure builder 16 configured to generate an application data structure that includes the content items which are to be incorporated into the authored mobile application. Such an application data structure can be generated in response to a user command to export selected content from content management system 10. The exported content can form the basis of a mobile application, and may include active content such as interactive user interface elements, control features, and scripts that define functionality which is to be provided by the application. The exported content may correspond to a plurality of separate pages which are aggregated into a single page application data structure that forms the basis for a platform-specific or cross-platform hybrid single page application. For example, where a user defines a multi-page application that incorporates several different content items managed by content management system 10, application data structure builder 16 can be used to generate a single page HTML DOM application structure which can form the basis for a single page application produced by mobile development framework 30.

Still referring to the example embodiment illustrated in FIG. 1, client computing device 20 may comprise, for example, one or more devices selected from a desktop or laptop computer, a workstation, a tablet, a smartphone, a set-top box, or any other such computing device. A combination of different devices may be used in certain embodiments. Although one content management system 10 and one client computing device 20 are illustrated in FIG. 1, other embodiments may include any appropriate number of content management systems and/or client devices. As illustrated in the example embodiment of FIG. 1, client computing device 20 includes a processor 22, a memory 24, an operating system 26 and a communications module 28. As can be further seen, a bus and/or interconnect 29 is also provided to allow for intra-device communications using, for example, communications module 28. Other componentry and modules typical of a computing system, such as input devices, output devices, and user interface modules are not shown but will be readily apparent in light of this disclosure. Thus it will be appreciated that the embodiments disclosed herein are not intended to be limited to the particular configuration of the client computing device 20 illustrated in FIG. 1, and that other configurations and components can be used in other embodiments.

Processor 22 can be any suitable processor, and may include one or more coprocessors or controllers, such as an audio processor or a graphics processing unit, to assist in control and processing operations associated with client computing device 20. Memory 24 can be implemented using any suitable type of digital storage, such as one or more of a disk drive, a universal serial bus (USB) drive, flash memory, and/or random access memory. Operating system 26 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with client computing device 20, and therefore may also be implemented using any suitable existing or subsequently-developed platform. Communications module 28 can be any appropriate network chip or chipset which allows for wired and/or wireless connection to network 50 or peripheral hardware such that client computing device 20 can communicate with other local and/or remote computing systems, servers, peripheral hardware devices, and/or resources.

Referring again to the example networked computer system illustrated in FIG. 1, in certain embodiments mobile development framework 30 comprises a software framework that supports the development of mobile applications that can be executed on, and that leverages the capabilities of, one or more mobile computing platforms. In general, mobile development framework 30 can be understood as producing a generic native application that is specifically configured for a particular mobile computing platform, and that provides an operational environment where HTML, JavaScript, CSS, or other application content can be executed. Mobile development framework 30 advantageously allows developers to write generic HTML-, JavaScript- or CSS-based applications without requiring specific knowledge of the particular mobile platforms upon which a corresponding finished application is to be executed. However, conventional mobile development frameworks tend to suffer from a lack of integration with the content management systems which are often used provide the content which forms the basis for a given application. For example, in the context of single page application development, such applications can be based on an application data structure created using, for example, a JavaScript framework such as Backbone.js. In general, this is not useful for content authors who are unfamiliar with JavaScript, HTML, CSS, or any of the other tools which are used to organize content into an application data structure which can be used by a mobile development framework. In particular, existing frameworks for building application data structures are not capable of obtaining and integrating content provided by a content management system in an automated fashion.

However, where content management system 10 includes application data structure builder 16 as disclosed herein, mobile development framework 30 is capable of generating a single page application directly from such a data structure. To this end, in certain embodiments mobile development framework 30 includes an application compiler 32, one or more platform-specific device application programming interfaces (APIs) 34 and a resource library 36 containing platform-specific resources which can be used to invoke various functionalities on a given computing platform. For example, providing platform-specific device APIs advantageously enables framework 30 to access various device-specific features such as geographic location capability, contact lists, camera functionality, and notification alert functionality. In one embodiment the functionality associated with mobile development framework 30 is provided by PhoneGap (Adobe Systems Incorporated, San Jose, Calif.).

Still referring to FIG. 1, in certain embodiments the networked computer system optionally has access to functionality associated with an online application repository 40. In such embodiments application repository 40 is configured to facilitate distribution of applications, and thus may include subcomponents such as one or more of an application validation module 42, an e-commerce storefront 44, and an application library 46. Examples of application repositories include the iTunes Store (Apple Inc., Cupertino, Calif.), Google Play (Google Inc., Mountain View, Calif.), Windows Store (Microsoft Corp., Redmond, Wash.), and BlackBerry World (BlackBerry Ltd., Waterloo, ON). Application validation module 42 can be configured to validate the functionality, security, and other characteristics of uploaded applications to provide a degree of quality control for the applications available through repository 40. E-commerce storefront 44 can be used to receive payment in exchange for application downloads and to provide other functionality associated with electronic commerce interfaces, such as consumer reviews, product support, and account management. Application library 46 can serve as a storage resource for the various applications made available through repository 40, and may comprise a geographically distributed network of storage resources in communication with repository 40.

The various embodiments disclosed herein, including some or all of the functionality disclosed herein, can be implemented in various forms of hardware, software, firmware, and/or special purpose processors. For example, in one embodiment a non-transitory computer readable medium has instructions encoded thereon that, when executed by one or more processors, cause one or more of the application authoring methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications and/or apps that are tangibly embodied on a memory device, and that can be executed by a computer having any suitable architecture. In one embodiment, the system can be hosted on a given website and implemented using JavaScript or another suitable browser-based technology, for example.

The functionality disclosed herein can optionally be incorporated into other software applications, such as content authoring applications, mobile resource development applications, or peripheral device controller applications. For example, a content authoring application that forms part of a content management system can be configured to provide a graphical user interface that allows a user to drag-and-drop content items, user interface elements, and control features into a page template that is to form part of a mobile application being authored by a user. In response to an export command, application data structure builder 16 can be configured to generate an application data structure which can form the basis for a platform-specific application produced by mobile development framework 30. The computer software applications disclosed herein may include a number of different modules, sub-modules, or other components of distinct functionality, and can provide information to, or receive information from, still other components and/or services. These models can be used, for example to communicate with input and/or output devices such as a display screen, a touch sensitive surface, a printer, and/or any other suitable input/output device. Other components and functionality not reflected in the illustrations will be apparent in light of this disclosure, and it will be appreciated that the claimed invention is not intended to be limited to any particular hardware or software configuration. This in other embodiments the components illustrated in FIG. 1 may comprise additional, fewer, or alternative subcomponents.

The aforementioned non-transitory computer readable medium may be any suitable medium for storing digital information, such as a hard drive, a server, a flash memory, and/or random access memory. In alternative embodiments, the computer and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present invention is not intended to be limited to any particular system architecture.

Methodology

Figure 2:
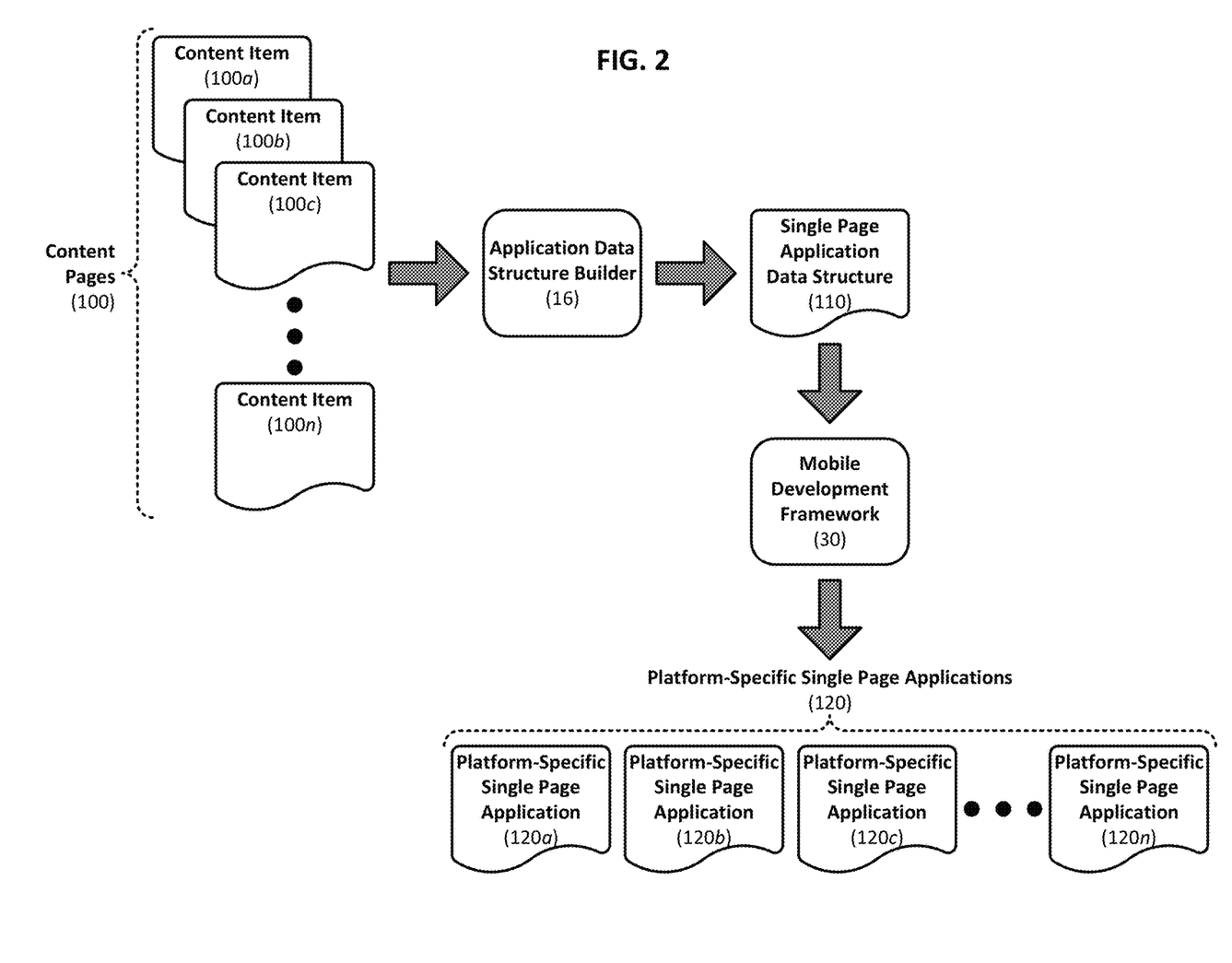
FIG. 2 is a data flow diagram schematically illustrating how multiple content pages provided by a content management system can be used to generate a plurality of platform-specific single page applications in accordance with certain embodiments of the present invention.
Figure 3:
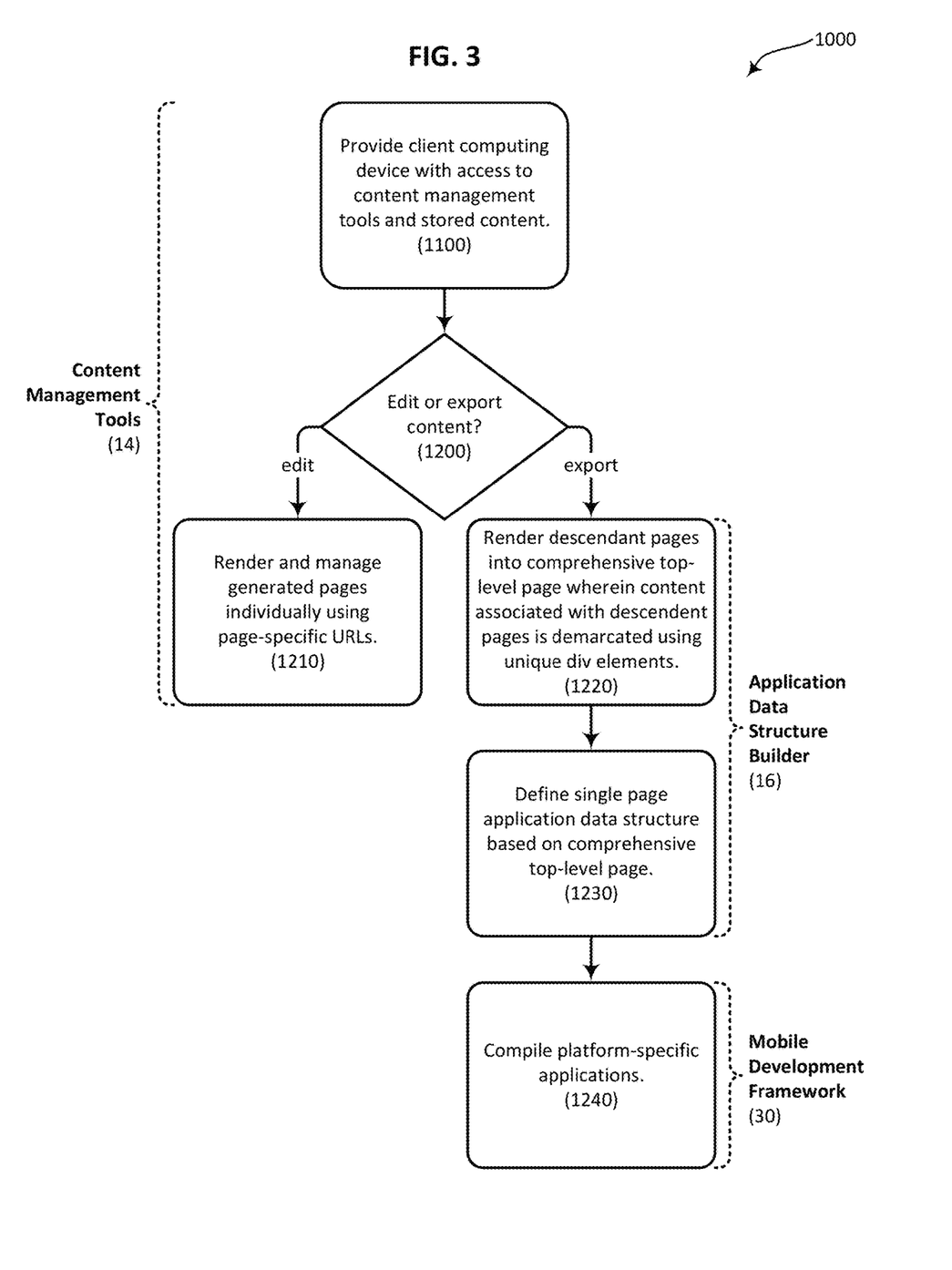
FIG. 3 is a flowchart illustrating an example method for producing one or more platform-specific single page applications which are based on content pages provided by a content management system in accordance with certain embodiments of the present invention.

FIG. 2 is a data flow diagram schematically illustrating how multiple content pages 100 provided by content management system 10 can be used to generate a plurality of platform-specific single page applications 120 in accordance with certain embodiments of the present invention. FIG. 3 is a flowchart illustrating an example method 1000 for producing one or more platform-specific single page applications 120 which are based on content pages 100 provided by content management system 10 in accordance with certain embodiments of the present invention. As can be seen, this method 1000 includes a number of phases and sub-processes, the sequence of which may vary from one embodiment to another. However, when considered in the aggregate, these phases and sub-processes form a complete single page application authoring process that is responsive to user commands in accordance with certain of the embodiments disclosed herein. These methodologies can be implemented, for example, using the system architecture illustrated in FIG. 1 and described herein. However other system architectures can be used in other embodiments, as will be apparent in light of this disclosure. To this end, the correlation of the various data flows and functionalities shown in FIGS. 2 and 3 to the specific components illustrated in FIG. 1 is not intended to imply any structural and/or use limitations. Rather, other embodiments may include, for example, varying degrees of integration where multiple functionalities are effectively performed by one system. Likewise, certain functionalities illustrated as being associated with particular component in FIG. 1 may instead by associated with a different component in an alternative embodiment. For example, in a modified embodiment the functionality associated with application data structure builder 16 can be incorporated into mobile development framework 30, such that framework 30 is capable of building an appropriate application data structure based on content received from content management system 10. Thus other embodiments may have fewer, more, or modified modules depending on the granularity of a particular implementation. Numerous variations and alternative configurations will be apparent in light of this disclosure.

As illustrated in FIGS. 2 and 3, method 100 commences with providing client computing device 20 with access to content management tools 14 and content stored in content repository 18. See reference numeral 1100 in FIG. 3. Client computing device 20 may also optionally be provided with a content management user interface 12 that allows a plurality of content items 100*a*, 100*b*, 100*c*, . . . , 100*n* to be aggregated into a desired structure. For example, content management tools 14 may be used to build a webpage or a mobile application having a hierarchical tree structure, wherein a homepage includes a plurality of links to secondary pages through which additional content can be accessed. These secondary pages may include links providing access to tertiary pages, to other content provided in the webpage or mobile application, or to external resources. In certain embodiments content management user interface 12 includes a graphical user interface that allows a user to drag-and-drop content items, user interface elements, and control features into a page template that is to form part of a mobile application being authored by a user. Such a user interface is particularly useful in the context of a mobile application development environment where content is commonly presented to an end user as part of a graphical user interface.

Figure 4A:
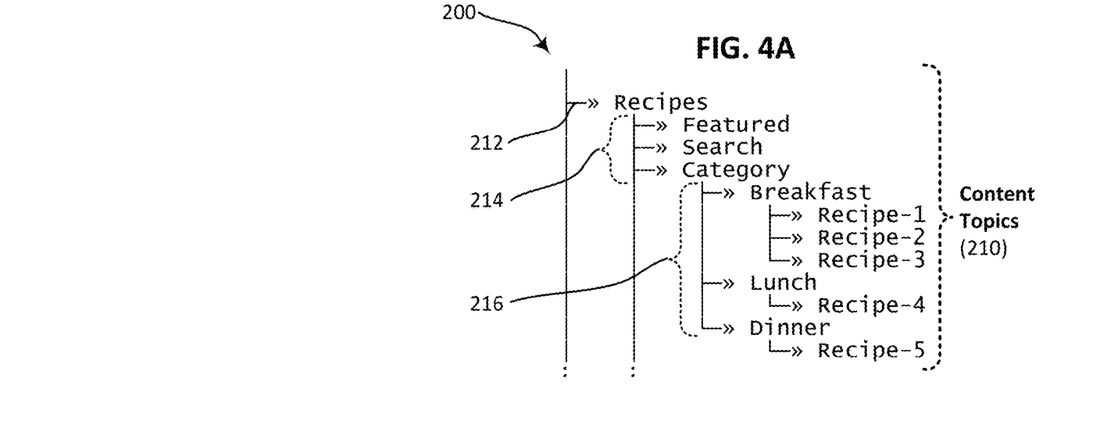
FIG. 4A illustrates a portion of an example hierarchical content structure comprising a plurality of topics that each correspond to a content page managed by a content management system in accordance with certain embodiments of the present invention.

In certain embodiments content management tools 14 are configured to recognize whether content is being edited or otherwise manipulated, or is being exported for use with mobile development framework 30. See reference numeral 1200 in FIG. 3. Where the content is being edited or otherwise manipulated, the pages can be rendered and managed individually using a page-specific uniform resource locator (URL) for each page. See reference numeral 1210 in FIG. 3. This allows a content author to manipulate content for a selected page without regard to how such manipulations may affect content provided on other parts of a related webpage, application, or the like. Thus, for example, a homepage or "top-level" page can be authored and managed independently of lower-level or "descendant" pages which are accessible via the top-level page. FIG. 4A illustrates portions of an example hierarchical content structure 200 comprising a plurality of content topics 210 that each correspond to a content page 100 managed by content management system 10 in accordance with certain embodiments of the present invention. Topics 210 include top level topic 212 "Recipes", which can be understood as corresponding to a top-level content item 100*a*. Topics 210 also include secondary topics 214 "Featured", "Search" and "Category", which can each be understood as corresponding to multiple secondary content items 100*b*. Topics 210 also include tertiary topics 216 "Breakfast", "Lunch", and "Dinner", which can each be understood as corresponding to multiple tertiary content items 100*c*. This pattern can be repeated such that hierarchical content structure 200 includes any appropriate number of top-level and descendant topics corresponding to one or more of a plurality of content pages 100. Top level topic 212 can serve as an entry point for browsing or otherwise accessing the hierarchical content structure 200. Each page 100 can be associated with a page-specific URL through which the corresponding content item can be accessed and manipulated via content management system 10.

There are several advantages associated with rendering and managing content based on page-specific URLs in content management system 10. For example, content can easily be shared amongst the various pages of a given application or even between different applications. This configuration also allows a content author to generate and modify content using familiar content editing tools which are specifically adapted for mobile application user interface design. For instance, providing a content authoring environment that is native to content management system 10 allows a content author to easily leverage integrated services such as a transactional system for use with e-commerce applications or an interactive messaging interface for use with social networking applications. In addition, content access rights defined by content management system 10 can be enforced to ensure that a given user is able to access and/or modify only content for which such actions are authorized. The content editing mode disclosed herein is optionally configured as a default configuration for accessing content managed by content management system 10.

However, at some point a content author may wish to export content from content management system 10, for example to generate a single page application using mobile development framework 30. Thus, in response to a user command, application data structure builder 16 can be configured to render the descendant pages into a comprehensive top-level page wherein the content associated with the descendant pages is demarcated using unique div elements within the top-level page. See reference numeral 1220 in FIG. 3. In certain embodiments the top-level page renders all of its descendant pages into itself by (a) creating a div section for each descendent page and (b) assigning each div section a unique identifier based on the path of the corresponding descendant page. A single page application data structure 110 can then be defined based on the resulting comprehensive top-level page. See reference numeral 1230 in FIG. 3. Mobile development framework 30 can use single page application data structure 110 to compile one or more platform-specific single page applications 120*a*, 120*b*, 120*c*, . . . , 120*n* which are configured for execution on a particular mobile computing platform. See reference numeral 1240 in FIG. 3. Thus single application data structure 110 can support the generation of applications for a variety of different mobile platforms. As disclosed herein, single page applications 120 advantageously reduce network bandwidth and require fewer processing resources in many applications, and thus often provide improved performance in the context of execution on a mobile computing platform.

For example, in one embodiment single page application data structure 110 comprises an HTML DOM structure that includes links to the content which is to be used by a particular application. This content can be rendered in a comprehensive top-level page with subordinate content being demarcated using, for example, unique div elements. Each div element can be assigned a unique identifier based on the path of the corresponding content item stored in content management system 10. Thus application data structure builder 16 and the resulting application data structure 110 provides an automated way of mapping content provided by content management system 10 to single page applications 120 which are produced by mobile development framework 30.

Figure 4B:
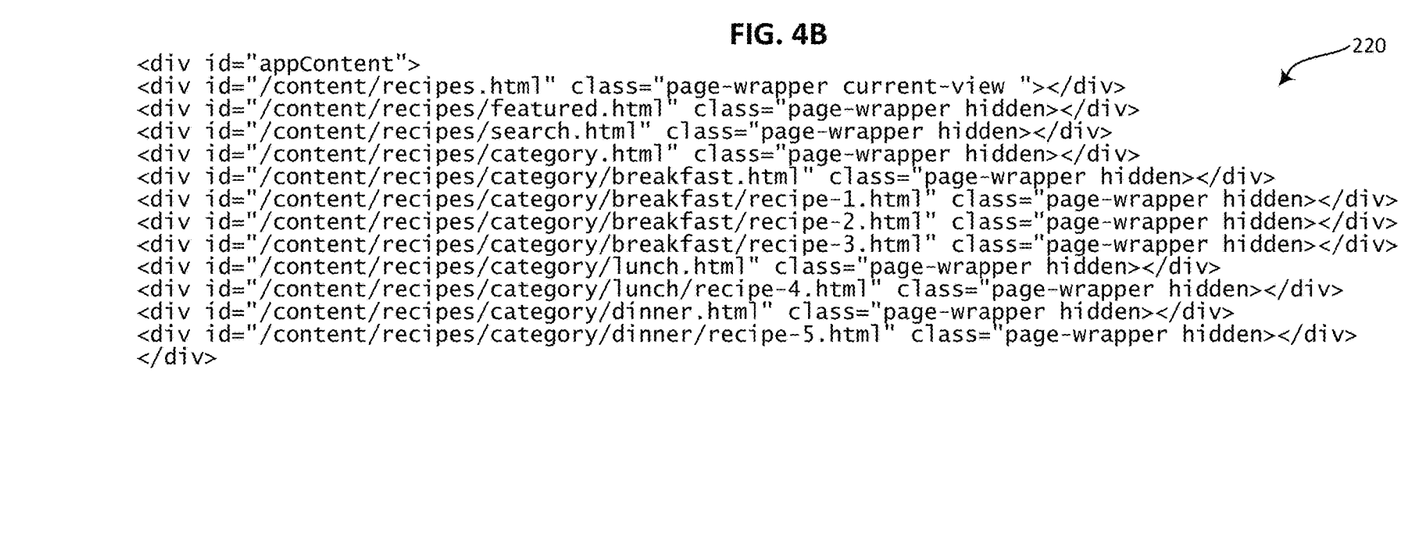
FIG. 4B illustrates portions of an example HTML DOM structure that includes an identifier that enables linking content which is to be used by a given single page application, and that is based on the hierarchical content structure of FIG. 4A, in accordance with certain embodiments of the present invention.

FIG. 4B illustrates portions of an example HTML DOM structure 220 that includes links to the content which is to be used by a given single page application, and that is based on hierarchical content structure 200 of FIG. 4A, in accordance with certain embodiments of the present invention. In particular, FIG. 4B illustrates a plurality of div elements associated with a unique identifier corresponding to the path of a particular content item stored in content management system 10. One example of such an identifier is id="/content/recipes/category/-breakfast/recipe-1.html". When HTML DOM structure 220 is wrapped by mobile application framework 30 into one or more platform-specific single page applications 120, this identifier can be used to obtain content used by such applications. Incorporating the content of descendant pages into a single HTML DOM structure 220 allows a single page application to be compiled that provides page-to-page navigational transitions having a degree of fluidity and responsiveness that users have come to expect from native device applications.

Thus certain embodiments of the systems disclosed herein are configured to respond to a user command to export selected content by automatically generating application data structure 110, which corresponds to the selected content, and providing the generated application data structure 110 to mobile device framework 40. Advantageously, the same user interface that is used to make content selections can be used to generate a content export command. Mobile device framework 40 can be configured to automatically compile one or more platform-specific single page applications corresponding to application data structure 110. Such a configuration advantageously provides a one-click solution for a user to generate a single page application from content that is managed by a content management system. In certain embodiments the generated application can be provided directly to application repository 40. In other embodiments the user can be provided with a link to the generated application, thereby facilitating subsequent manipulation of the generated application.

Conclusion

Numerous variations and configurations will be apparent in light of this disclosure. For example, one example embodiment provides a method for authoring an application that comprises receiving a user selection of a plurality of content items that are to be included within an authored single page application. The content items are managed by a content management system. The method further comprises, in response to a user command, building an application data structure having a plurality of unique elements corresponding to the selected plurality of content items. The method further comprises exporting the application data structure to a mobile development framework that is configured to produce the single page application based on the provided application data structure. In some cases, the method further comprises providing a link to an executable version of the single page application in response to the user command, wherein the link is provided without further user input beyond the user command. In some cases (a) the mobile development framework is configured to produce a plurality of single page applications based on the provided application data structure; and (b) the plurality of single page applications corresponds to a plurality of mobile device platforms. In some cases the plurality of content items includes at least one application user interface element selected from a group consisting of a selection menu, a toggle switch and a text entry field. In some cases the user selection of the plurality of content items and the user command are received via a content management system user interface. In some cases the application data structure conforms to a hypertext markup language document object model structure. In some cases the application data structure conforms to a document object model structure. In some cases the application data structure includes a plurality of div elements corresponding to the selected plurality of content items. In some cases the application data structure includes a plurality of div elements that contain content associated with the selected plurality of content items. In some cases the application data structure includes a plurality of network addresses corresponding to the selected plurality of content items. In some cases the application data structure is built without further user input beyond the user command.

Another example embodiment of the present invention provides an application authoring system that comprises a content repository. The system further comprises a content management user interface module configured to receive a user selection of a plurality of content items that are stored in the content repository, and that are to be included within a platform-specific mobile application. The system further comprises an application data structure builder configured to generate an application data structure having a plurality of unique elements corresponding to the selected plurality of content items. The system further comprises a mobile development framework configured to produce a platform-specific mobile application based on the generated application data structure. In some cases the content management user interface module is further configured to receive a user command that causes the application data structure to be generated. In some cases the application data structure includes a plurality of div elements that contain content associated with the selected plurality of content items. In some cases (a) the content management user interface module is further configured to detect a user selection between a content editing mode and a content exporting mode; and the application data structure builder generates the application data structure in response to user selection of the content exporting mode from within the content management user interface module. In some cases the application data structure includes content that is extracted from the content repository and that corresponds to the selected plurality of content items.

Another example embodiment of the present invention, provides a non-transitory computer readable medium having instructions encoded thereon that, when executed by one or more processors cause an application authoring process to be carried out. The process comprises receiving a user selection of a plurality of content items that are to be included within an authored mobile application. The content items are managed by a content management system. The process further comprises, in response to a user command, building an application data structure having a plurality of unique elements corresponding to the selected plurality of content items. The process further comprises exporting the application data structure to a mobile development framework that is configured to produce the mobile application based on the provided application data structure. In some cases the mobile application is a single page application. In some cases the user selection of the plurality of content items and the user command are received via a content management system user interface. In some cases the application data structure is built without further user input beyond the user command.

The foregoing description of the embodiments of the invention has been presented for purposes of illustration and description. It is not intended to be exhaustive or to limit the invention to the precise form described. Many modifications and variations are possible in light of this disclosure. It is intended that the scope of the invention be limited not by this detailed description, but rather by the claims appended hereto.

What is claimed is:

1. A method for authoring an application, the method comprising:
   receiving, at a content management system, from a client computing device, a first command that identifies a plurality of content pages that are to be included within an authored executable single page application, wherein each content page includes one or more content items managed by the content management system, wherein each content page has a corresponding path that defines a location in the content management system through which content items included in that content page are accessible, and wherein the plurality of content pages includes a top-level page having a link to one or more descendant pages;

receiving, at the content management system, from the client computing device, a second command to build an application data structure that, when processed by a mobile development framework, produces the executable single page application;

in response to receiving the second command, building the application data structure,
- wherein the application data structure has a plurality of unique div elements, each of which corresponds to one of the plurality of content items,
- wherein the unique div elements are rendered within a top-level of a document object model (DOM) structure that forms part of the application data structure,
- wherein, within the top-level of the DOM structure, there exists both a first div element corresponding to the top-level page as well as a second div element corresponding to one of the descendant pages,
- wherein the first and second div elements are within a same hierarchical level of the DOM structure, and
- wherein each unique div element includes the path of the corresponding content page; and exporting the application data structure from the content management system to the mobile development framework, wherein the executable single page application that is produced as a result of processing the application data structure by the mobile development framework is an application that is delivered to an end user in response to loading a single launch webpage, and that is configured to add additional resources to the loaded single launch webpage based on subsequent interaction with the application by the end user.

2. The method of claim 1, further comprising providing a link to the executable single page application in response to receiving the second command, without further user input beyond the second command.

3. The method of claim 1, wherein:
the mobile development framework is configured to produce a plurality of executable single page applications based on the application data structure; and
the plurality of executable single page applications corresponds to a plurality of mobile device platforms.

4. The method of claim 1, wherein a particular one of the content pages includes an application user interface element content item selected from a group consisting of a selection menu, a toggle switch and a text entry field.

5. The method of claim 1, wherein the first command is received via a user selection made on a content management system user interface.

6. The method of claim 1, wherein the document object model structure conforms to a hypertext markup language document object model structure.

7. The method of claim 1, wherein:
the content management system operates in a content editing mode and a content exporting mode; and
the first command is received by the content management system operating in the content exporting mode.

8. The method of claim 1, wherein the executable single page application that is produced by processing the application data structure includes the document object model structure provided within a platform-specific shell.

9. An application authoring system comprising:
a content management system;
a content repository administered by the content management system;
a user interface module for the content management system, the user interface module configured to
   receive, from a client computing device, a user selection of a plurality of content pages that are stored in the content repository, and that are to be included within an executable platform-specific mobile application, wherein each content page includes one or more content items that are stored in the content repository, wherein each content page has a corresponding path that defines a location in the content repository through which content items included in that content page are accessible, and wherein the plurality of content pages includes a top-level page having a link to one or more descendant pages, and
   receive, from the client computing device, a user command to generate an application data structure that, when processed by a mobile development framework, produces the executable platform-specific mobile application; and
an application data structure builder configured to generate the application data structure in response to receiving the user command,
- wherein the application data structure has a plurality of unique div elements, each of which corresponds to one of the selected plurality of content items,
- wherein the unique div elements are rendered within a top-level of a document object model (DOM) structure that forms part of the application data structure,
- wherein, within the top-level of the DOM structure, there exists both a first div element corresponding to the top-level page as well as a second div element corresponding to one of the descendant pages,
- wherein the first and second div elements are within a same hierarchical level of the DOM structure, and
- wherein each unique div element depends on the path of the corresponding content page;

wherein the mobile development framework is configured to produce the executable platform-specific mobile application as a result of processing the generated application data structure, wherein the executable platform-specific mobile application is an application that is delivered to an end user in response to loading a single launch webpage, and that is configured to add additional resources to the loaded single launch webpage based on subsequent interaction with the application by the end user.

10. The application authoring system of claim 9, wherein the application data structure builder is further configured to provide a link to the executable platform-specific mobile application in response to receiving the user command, without further user input beyond the user command.

11. The application authoring system of claim 9, wherein:
the user interface module is further configured to detect a selection between a content editing mode and a content exporting mode; and
the application data structure builder generates the application data structure in response to receiving the user command when the content exporting mode is invoked.

12. The application authoring system of claim 9, wherein the executable platform-specific mobile application is a single page application.

13. A non-transitory computer readable medium having instructions encoded thereon that, when executed by one or more processors cause an application authoring process to be carried out, the process comprising:

receiving, at a content management system, from a client computing device, a first command that identifies a plurality of content pages that are to be included within an authored executable mobile application, wherein each content page includes one or more content items that are managed by the content management system, wherein each content page has a corresponding path that defines a location in the content management system through which content items included in that content page are accessible, and wherein the plurality of content pages includes a top-level page having a link to one or more descendant pages;

after receiving the first command, receiving a second command at the content management system, from the client computing device, to build an application data structure that, when processed by a mobile development framework, produces the authored executable mobile application;

in response to receiving the second command, building the application data structure,
  wherein the application data structure has a plurality of unique div elements, each of which corresponds to one of the plurality of content items,
  wherein the unique div elements are rendered in a top-level of a document object model (DOM) structure that forms part of the application data structure,
  wherein, at the top-level of the DOM structure, there exists both a first div element corresponding to the top-level page as well as a second div element corresponding to one of the descendant pages,
  wherein the first and second div elements are at a same hierarchical level of the DOM structure, and
  wherein each unique div element includes the path of the corresponding content page; and  exporting the application data structure from the content management system to the mobile development framework, wherein the executable mobile application that is produced as a result of processing the application data structure by the mobile development framework is an application that is delivered to an end user in response to loading a single launch webpage, and that is configured to add additional resources to the loaded single launch webpage based on subsequent interaction with the application by the end user.

14. The non-transitory computer readable medium of claim 13, wherein the executable mobile application is a single page application.

15. The non-transitory computer readable medium of claim 13, wherein the executable mobile application that is provided by processing the application data structure includes the DOM structure provided within a platform-specific shell.

16. The non-transitory computer readable medium of claim 13, wherein the application authoring process further comprises providing a link to the authored executable mobile application in response to receiving the second command, without further user input beyond the second command.

17. The non-transitory computer readable medium of claim 13, wherein the DOM structure conforms to a hypertext markup language DOM structure.

18. The non-transitory computer readable medium of claim 13, wherein the mobile development framework is configured to produce a plurality of platform-specific executable mobile applications based on the application data structure.

19. The non-transitory computer readable medium of claim 13, wherein the application authoring process further comprises making a determination that the first command is received while the content management system is in a content exporting mode.

20. The non-transitory computer readable medium of claim 13, wherein the first command is received via a user interface provided by the content management system.

* * * * *